United States Patent [19]
Cuevas

[11] Patent Number: 5,690,357
[45] Date of Patent: Nov. 25, 1997

[54] DUAL STAGE AIR BAG INFLATOR

[75] Inventor: Jess A. Cuevas, Scottsdale, Ariz.

[73] Assignee: TRW Inc., Lyndhurst, Ohio

[21] Appl. No.: 637,856

[22] Filed: Apr. 25, 1996

[51] Int. Cl.$^6$ ............................................. B60R 21/26
[52] U.S. Cl. .......................... 280/737; 280/736; 280/741
[58] Field of Search ............................ 280/741, 736, 280/737; 102/530, 531, 202.14; 422/164–166; 222/3, 5

[56] References Cited

U.S. PATENT DOCUMENTS

| | | |
|---|---|---|
| 3,868,124 | 2/1975 | Johnson . |
| 3,877,721 | 4/1975 | Brown, Jr. . |
| 4,734,265 | 3/1988 | Nilsson et al. ........................ 422/165 |
| 5,016,914 | 5/1991 | Faigh et al. ........................... 280/741 |
| 5,263,740 | 11/1993 | Frey et al. . |
| 5,344,186 | 9/1994 | Bergerson et al. . |
| 5,348,344 | 9/1994 | Blumenthal et al. . |
| 5,351,988 | 10/1994 | Bishop et al. . |
| 5,364,127 | 11/1994 | Cuevas ................................... 280/741 |
| 5,460,406 | 10/1995 | Faigle ..................................... 280/741 |
| 5,470,104 | 11/1995 | Smith et al. . |
| 5,516,147 | 5/1996 | Clark et al. ............................ 280/737 |
| 5,529,333 | 6/1996 | Rizzi et al. ............................ 280/737 |
| 5,558,367 | 9/1996 | Cuevas .................................. 280/737 |
| 5,566,976 | 10/1996 | Cuevas .................................. 280/737 |
| 5,582,428 | 12/1996 | Buchanan et al. ................. 280/736 X |

*Primary Examiner*—Christopher P. Ellis
*Attorney, Agent, or Firm*—Tarolli, Sundheim, Covell, Tumino & Szabo

[57] ABSTRACT

An apparatus (20) for inflating an inflatable vehicle occupant protection device (22) comprises a container (24) which defines a chamber (26). Inflation fluid and ignitable material are in the chamber (26). The container (24) has an opening (60) through which inflation fluid may flow to inflate the protection device (22). A rupturable closure (62) blocks flow through the opening (60) in the container (24). A projectile (120) is supported by the container (24) in the chamber (26) at a location spaced from the closure (62). An actuatable igniter (104) is supported by the container (24) and produces combustion products to propel the projectile (120) to rupture the closure (62). The combustion products are directed into the chamber (26) to ignite the ignitable material in the chamber (26) before the projectile (120) ruptures the closure (62).

23 Claims, 6 Drawing Sheets

DUAL STAGE AIR BAG INFLATOR

BACKGROUND OF THE INVENTION

1. Technical Field

The present invention relates to an inflator for an inflatable vehicle occupant protection device, such as an air bag.

2. Description of the Prior Art

Inflators for inflatable vehicle occupant protection devices, such as air bags, are known. One type of known inflator includes a container for storing inflation fluid, such as an inert gas, under pressure. The inflator also includes an ignitable pyrotechnic material. The inflation fluid is heated by burning of the pyrotechnic material to increase the pressure in the container. The pressurized inflation fluid is directed from the container to inflate an air bag.

Another type of known inflator includes a container for storing a mixture of gases under pressure. The mixture of gases includes inflation fluid, such as an inert gas, and a combustible fuel gas. The inflation fluid is heated by combustion of the combustible fuel gas to increase pressure in the container. The pressurized inflation fluid is directed from the container to inflate an air bag.

SUMMARY OF THE INVENTION

The present invention is directed to an apparatus for inflating an inflatable vehicle occupant protection device. The apparatus comprises a container which defines a chamber. Inflation fluid and ignitable material are in the chamber. The container has an opening through which inflation fluid may flow from the chamber to inflate the protection device. A rupturable closure blocks flow through the opening. A projectile is supported by the container at a location spaced from the closure. Actuatable means supported by the container produces combustion products which propel the projectile to rupture the closure. The combustion products are directed into the chamber to ignite the ignitable material in the chamber before the projectile ruptures the closure. Combustion of the ignitable material heats the inflation fluid and increases the pressure of the inflation fluid.

The actuatable means comprises a first igniter which, upon actuation, propels the projectile toward the closure. Combustion products from the first igniter are released into the chamber upon the projectile moving a predetermined distance relative to the container. A second igniter may be used which, upon actuation, releases additional combustion products into the chamber.

The container comprises a tubular housing and a base fixed to the tubular housing. The base includes a tubular guide extending into the chamber. The guide supports the projectile in the chamber. The projectile comprises an end portion and a tubular portion extending from the end portion. The guide supports the tubular portion of the projectile and guides the projectile during movement towards the closure.

The first igniter directs combustion products into the guide and into the tubular portion of the projectile. A slot extends along the length of the tubular portion of the projectile. The slot directs the combustion products from the tubular portion of the projectile into the chamber when the projectile moves the predetermined distance relative to the guide.

The base includes a recess which receives an igniter. A passage in the base communicates with the recess. The recess is defined in part by a shoulder that limits movement of the igniter in a first direction relative to the base. A member is receivable in the passage to engage the igniter and limit movement of the igniter in a second direction opposite the first direction.

BRIEF DESCRIPTION OF THE DRAWINGS

The foregoing and other features and advantages of the present invention will become apparent to those skilled in the art to which the invention relates from reading the following specification with reference to the accompanying drawings, in which.

DESCRIPTION OF A PREFERRED EMBODIMENT

Figure 1:
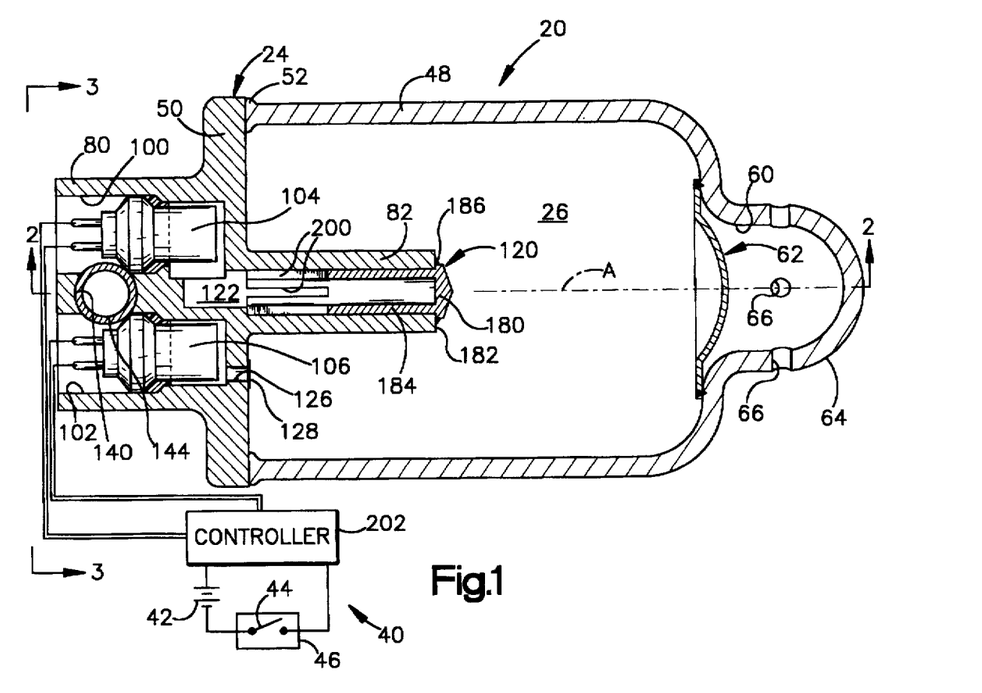
FIG. 1 is a schematic view of an inflator embodying the present invention for inflating an air bag.
Figure 2:
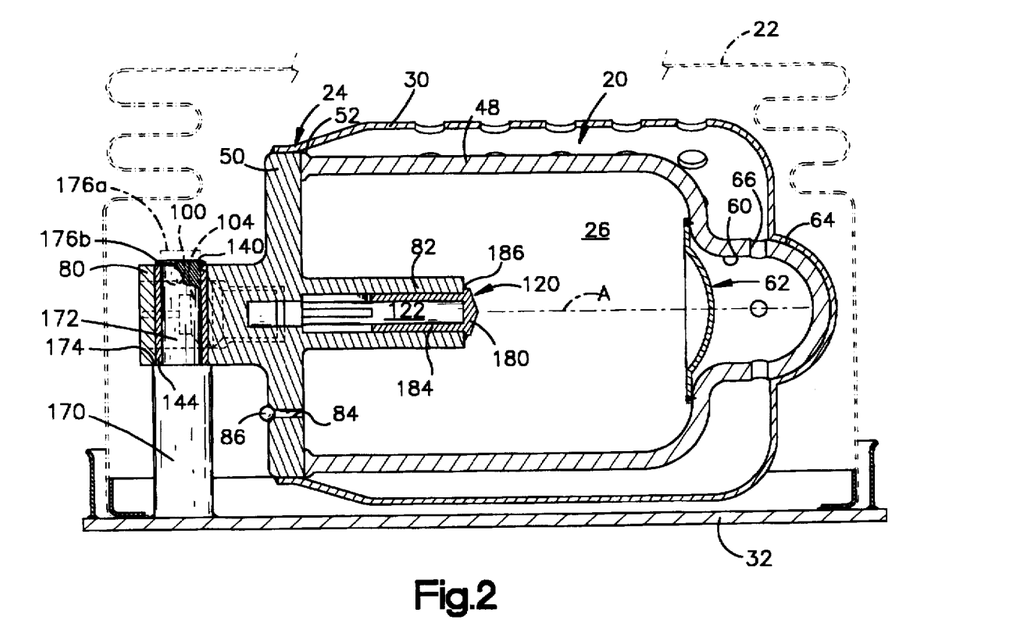
FIG. 2 is a sectional view of the inflator of FIG. 1, taken approximately along the line 2—2 in FIG. 1.

An inflator 20, embodying the present invention, is illustrated in FIG. 1. The inflator 20 is actuatable to inflate an inflatable vehicle occupant protection device, such as an air bag 22 (FIG. 2). By way of example, the inflator 20 and air bag 22 are mounted to a plate 32 which is attachable to a steering wheel (not shown) of a vehicle.

The inflator 20 includes a container 24 with a longitudinal central axis A. The container 24 defines a chamber 26. A mixture of gases is stored in the chamber 26. The mixture of gases preferably includes a combustible fuel gas, an oxidizer gas for supporting combustion of the fuel gas, and an inert gas. The combustible fuel gas is preferably hydrogen. The oxidizer gas is preferably oxygen. The inert gas is preferably nitrogen or argon. The mixture of gases may comprise hydrogen and dry air. The oxygen and nitrogen are provided by the dry air.

A diffuser 30 (FIG. 2) surrounds most of the container 24 and directs fluid released from the container into the air bag 22. The air bag 22 inflates into a position between a part of the vehicle, such as the steering wheel, and a vehicle occupant.

The inflator 20 is connected to an electrical actuation circuit 40. The circuit 40 includes a power source 42, which is preferably a battery or capacitor of the vehicle, and a normally open switch 44. The switch 44 is part of a sensor 46 which senses a condition of the vehicle for which inflation of the air bag 22 is desired, such as a collision or sudden deceleration above a predetermined deceleration. The switch 44 closes to conduct electrical power from the power source 42 to actuate the inflator 20.

The container 24 includes a tubular housing 48 which is open at its left end, as viewed in FIG. 1. The container 24 also includes a base 50 which is fixed to the housing 48 by a friction weld 52. The base 50 closes the left end of the housing 48, as viewed in FIG. 1, to define the chamber 26.

The base 50 and the housing 48 are made from a material, such as aluminum or stainless steel, that is chemically unreactive with the combustible fuel gas of the mixture of gases in the chamber 26.

The housing 48 includes a surface portion which defines an outlet opening 60. A closure 62 extends across the opening 60 and is fixed to the housing 48 to block fluid flow through the opening. The housing 48 also includes a diffuser portion 64 adjacent the outlet opening 60 and the closure 62. A plurality of passages 66 direct fluid from the diffuser portion 64 into the diffuser 30 for inflating the air bag 22.

The base 50 includes an outer central portion 80 (FIGS. 1-4) which projects away from and is located outside the chamber 26. The base 50 also includes a tubular guide 82 which projects into and is located inside the chamber 26. The base 50 has a fill port 84 (FIG. 2) which is spaced radially from the axis A of the container 24, the guide 82 and the outer central portion 80. The fill port 84 enables the chamber 26 to be filled with fluid from a fluid source. The fill port 84 is closed by a spherical member 86 which is welded to the base 50 after the chamber 26 is filled with the fluid, which is the mixture of gases.

Figure 4:
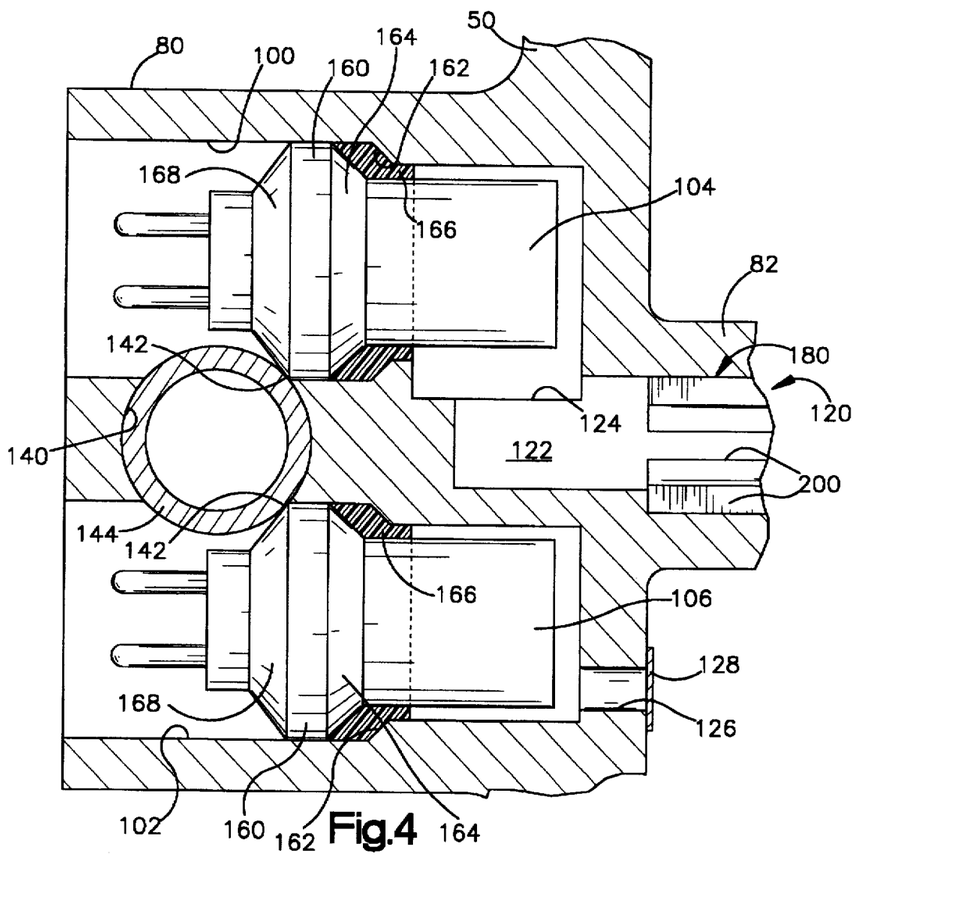
FIG. 4 is an enlarged sectional view of a portion of the inflator in FIG. 1.

The base 50 further includes surfaces in the outer central portion 80 which define a pair of recesses 100, 102 (FIG. 4). The recesses 100, 102 are substantially cylindrical and extend in a direction parallel to the axis A of the container 24. Actuatable means, such as an igniter 104, is located in the recess 100. Actuatable means, such as an igniter 106, is located in the recess 102. The actuatable means may also be provided in the form of any suitable means for igniting the combustible fuel gas of the mixture of gases or heating the inert gas in the chamber 26, such as an initiator or a squib and ignitable pyrotechnic material.

A projectile 120 is supported in the chamber 26 by the guide 82 of the base 50. Specifically, the projectile 120 is received telescopically in the guide 82. The projectile 120 and guide 82 cooperate to define an expansible chamber 122. The chamber 122 is in fluid communication with the recess 100 through a connecting passage 124 (FIG. 4) formed in the base 50. The projectile 120 is movable relative to the guide 82 in response to actuation of the igniter 104.

The recess 102 communicates with the chamber 26 through an opening 126 in the base 50. A thin metal member 128 covers the opening 126 initially to block communication between the recess 102 and the chamber 26. The member 128 ruptures in response to actuation of the igniter 106 to allow communication between the chamber 26 and recess 102 through the opening 126.

Figure 3:
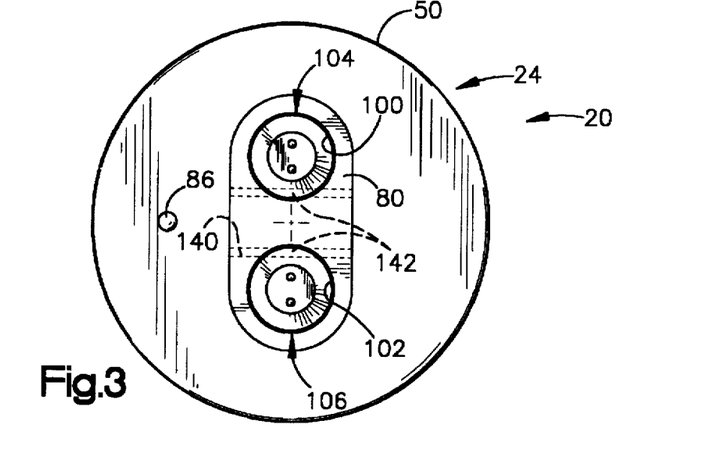
FIG. 3 is an end view of the inflator of FIG. 1, taken along the line 3—3 in FIG. 1.

A passage 140 (FIG. 2) is formed in the outer central portion 80 of the base 50 and extends in a direction transverse to the longitudinal extent of each of the recesses 100, 102 and the axis A. The passage 140 intersects the recesses 100, 102 at regions 142 (FIGS. 3 and 4). The passage 140 receives a shaft member 144 which engages the igniters 104, 106 in the regions 142 to hold the igniters in the recesses 100, 102. The shaft member 144 is tubular and has opposite ends that are staked to the outer central portion 80 of the base 50. The ends of the shaft member 144 are staked by being deformed radially outward against the outer central portion 80 to inhibit movement of the shaft member in the passage 140 relative to the base 50.

Each of the igniters 104, 106 has a respective flange 160 extending radially outward. Each of the recesses 100, 102 is defined in part by a respective shoulder surface 162. When the igniters 104, 106 are placed in the respective recesses 100, 102, a first portion 164 of each igniter flange 160 engages a respective one of a pair of seals 166. Each seal 166 is located between the shoulder surface 162 of the respective recess 100, 102 and the first portion 164 of the respective igniter flange 160. The seals 166 are made from a resiliently compressible elastomeric material.

When the shaft member 144 engages a second portion 168 of the flange 160 of the respective igniters 104, 106 on a side opposite the first portion 164, the seals 166 compress. The force of the seals 166 resiliently attempting to return to an uncompressed condition biases the flanges 160 of the igniters 104, 106 in a direction against the shaft member 144. The igniters 104, 106 are thus maintained in the respective recesses 100, 102 by the interaction of the seals 166, the shoulder surfaces 162, and the shaft member 144. The seals 166 also inhibit fluid from leaking between the igniters 104, 106 and the surfaces which define the recesses 100, 102.

A post 170 is attached to and extends from the plate 32. The inflator 20 is attached to the post 170 in any suitable manner. By way of example, the post 170 extends through the shaft member 144. An undeformed upper end 176a of the post 170, as viewed in FIG. 2 and shown in dashed lines, extends from the shaft member 144. A lower end of the shaft member 144, as viewed in FIG. 2, and the central portion 80 of the base 50 engage a shoulder 174 formed on the post 170. The undeformed end 176a of the post 170 is deformed against the upper end of the shaft member 144, as viewed in FIG. 2 and shown in solid lines as 176b, to hold the inflator 20 in a desired position relative to the post 170 and the plate 32.

The projectile 120 includes an end portion 180 (FIGS. 1 and 2) which is located outside of the guide 82 and initially engages a distal end surface 182 of the guide. The end portion 180 of the projectile 120 is attached to the end surface 182 of the guide 82 by a continuous circumferential weld 186. The weld 186 seals the chamber 122 from the chamber 26. The projectile 120 also includes a tubular body 184 which is attached to and extends from the end portion 180. The tubular body 184 fits within and is supported by the guide 82. The tubular body 184 of the projectile 120 includes a plurality of longitudinally extending slots 200 which are circumferentially spaced around an end of the tubular body opposite the end portion 180. The slots 200 are located initially within the guide 82.

The inflator 20 may be operated in several modes, such as (i) when only the igniter 104 is actuated, (ii) when the igniter 106 is actuated concurrently with actuation of the igniter 104, or (iii) when the igniter 106 is actuated at a time after actuation of the igniter 104. It will be apparent that the timing of the actuation of the igniter 106 affects the pressure, as a function of time, of inflation fluid which is directed into the air bag 22. The mode of operation is determined by a controller 202 (FIG. 1) in response to various parameters that are monitored and used by the controller. Whether the igniter 106 is actuated and when it is actuated relative to actuation of the igniter 104 is determined by the controller 202 to tailor the pressure in the air bag 22 as a function of time in response to the various parameters.

Figure 5:
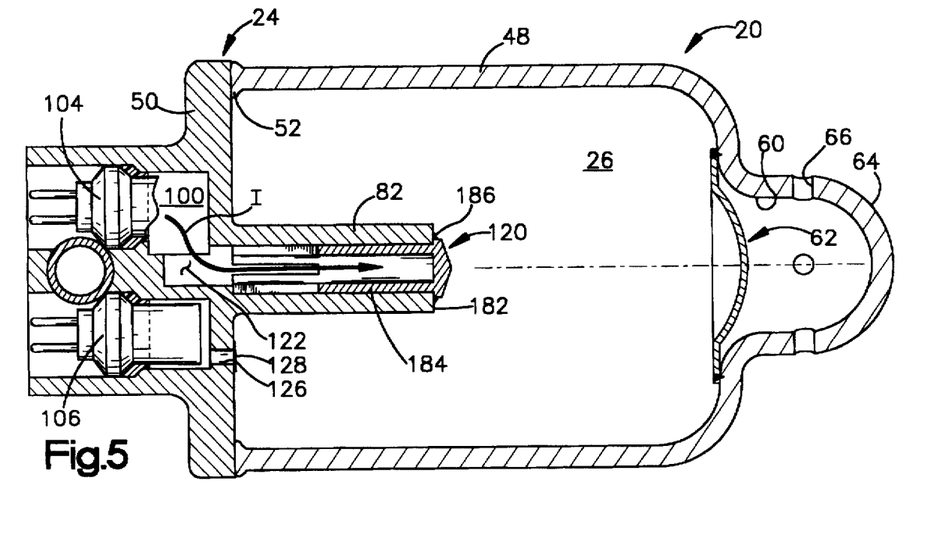
FIGS. 5–7 are views similar to FIG. 1 illustrating parts of the inflator in different conditions during one mode of operation.

In one mode of operation, when the switch 44 (FIG. 1) in the sensor 46 closes, electrical power is conducted through the controller 202 to actuate the igniter 104. The igniter 106 is not actuated. Upon actuation of the igniter 104, combustion products I (FIG. 5) are released into the recess 100. The seal 166 inhibits combustion products I from flowing out of the recess 100 past the igniter 104. The combustion products I flow through the passage 124 into the chamber 122.

Figure 6:
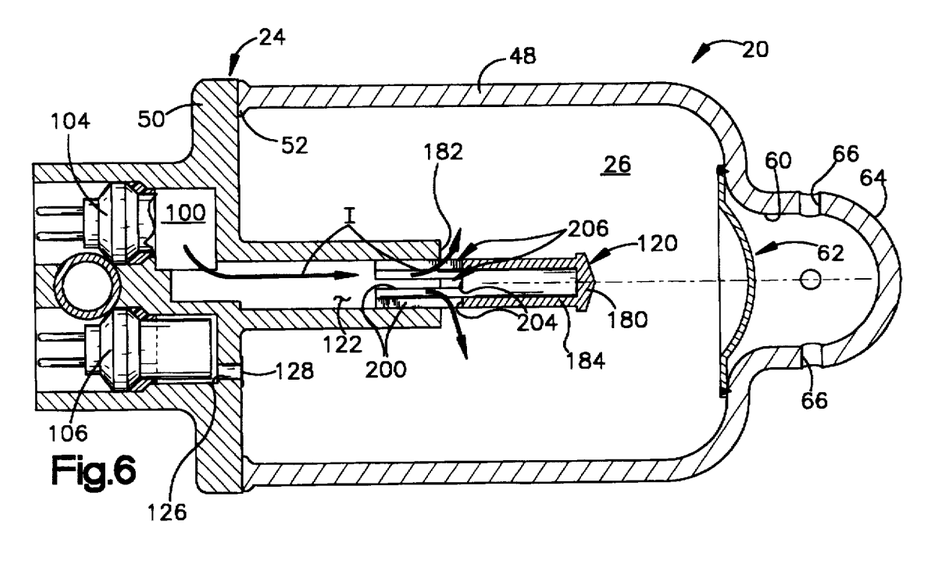

The combustion products I act on interior surfaces of the projectile 120 to separate the projectile from the guide 82 in the area adjacent the attachment weld 186. The combustion products I force the projectile 120 to move to the right relative to the guide 82, as viewed in FIG. 5. As the projectile 120 moves to the right, as illustrated in FIG. 6, ends 204 of the slots 200 move to a position past the end surface 182 of the guide 82. Several openings 206 are defined in a circumferential array around the tubular body 184 by the slots 200.

The combustion products I in the chamber 122 flow through the openings 206 and into the chamber 26. The openings 206 increase in flow area as the projectile 120 continues to move relative to the guide 82. The combustion products I which are released into the chamber 26 start ignition of the combustible fuel gas in the mixture of gases. Combustion of the fuel gas generates heat which increases the pressure of gas in the chamber 26.

Figure 7:
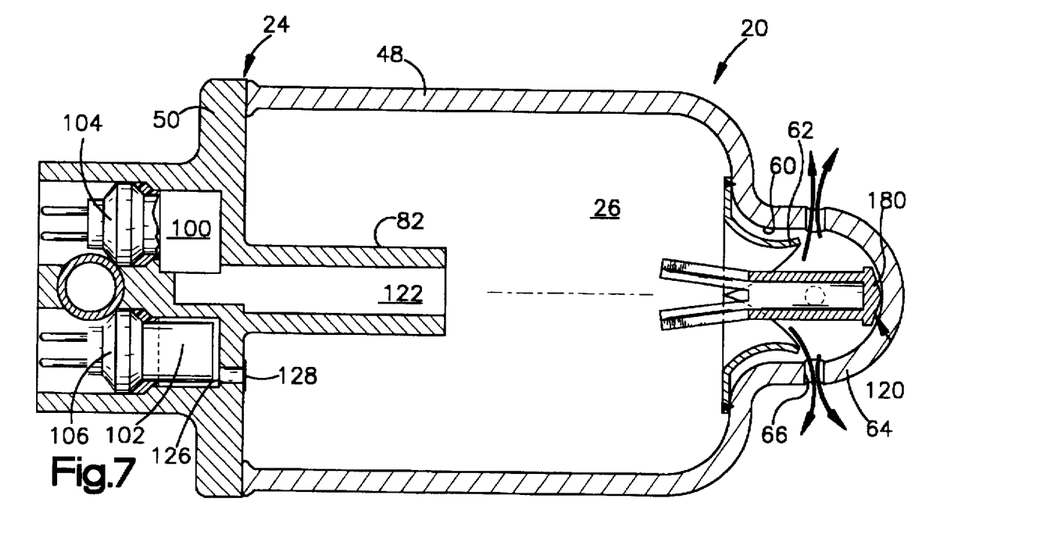

The projectile 120 continues to move out of the guide 82 and ruptures the closure 62. The pressurized gas is released from the chamber 26 in the container 24. The projectile 120 continues to move through the ruptured closure 62 and the end portion 180 of the projectile 120 engages the diffuser portion 64. The pressurized gas flows from the chamber 26, through the opening 60, into the diffuser portion 64 and is directed to inflate the air bag 22.

The air bag 22 is thus inflated by inert gas, by-products from combustion of the fuel gas, and unconsumed oxidizer gas in the mixture of gases. The total volume of inert gas which must be stored in the chamber 26 of the container 24 to inflate the air bag 22 to a desired pressure is minimized. It will be apparent that a small amount of the combustible fuel gas could remain unburned when the closure 62 is ruptured.

In a second mode of operation, the igniter 106 is actuated at the same time or slightly after the igniter 104 but before the closure 62 is ruptured by the projectile 120. In this mode of operation, the igniter 104 (FIG. 8) is actuated in a manner identical to that which is illustrated in FIG. 6 and described above. The igniter 106 is actuated to produce combustion products C which are released into the recess 102. The passage 126 directs the combustion products C against the member 128 to rupture the member.

Figure 8:
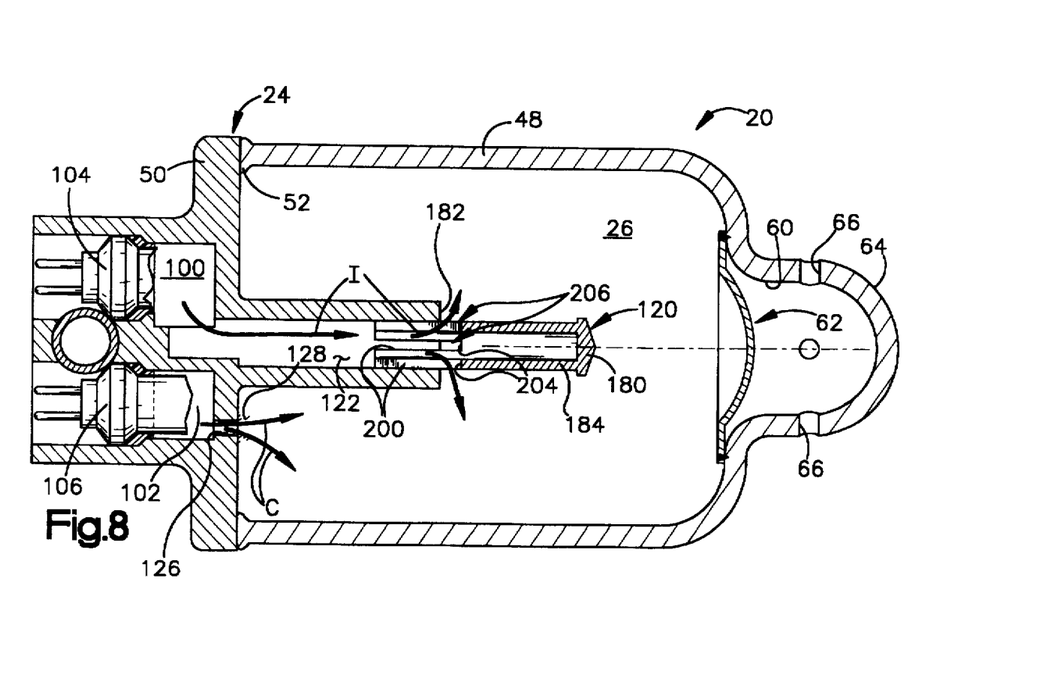
FIGS. 8–10 are views similar to FIG. 1 illustrating parts of the inflator in different conditions during another mode of operation.
Figure 9:
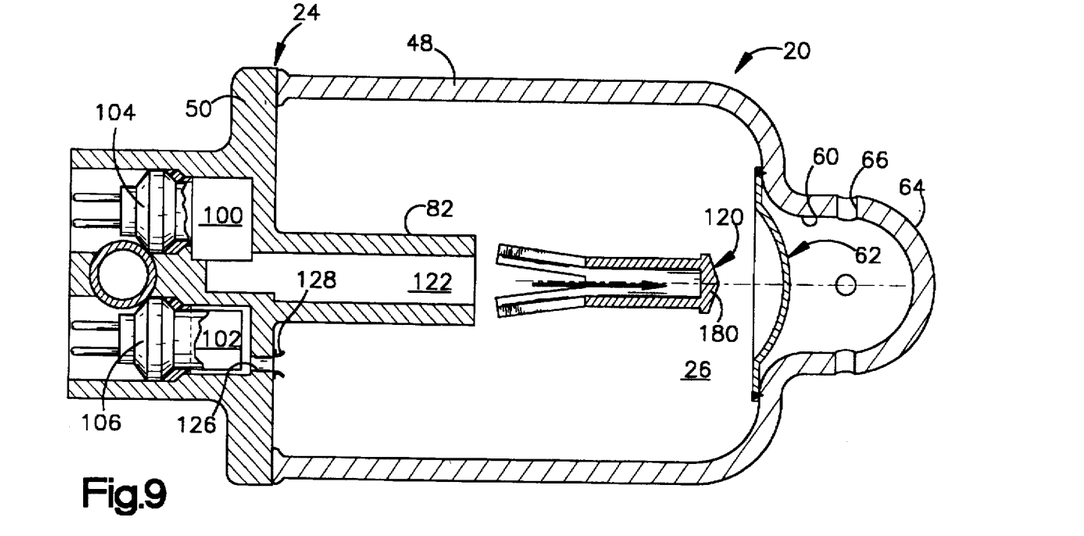

The combustion products C are released into the chamber 26, as illustrated in FIG. 8, to provide an additional volume of gas in the chamber. The combustion products C also ignite the combustible fuel gas in the mixture of gases in the chamber 26. Combustion of the combustible fuel gas heats and pressurizes gas in the chamber 26. The projectile 120 then moves to a position completely outside of the guide 82. In this mode of operation, combustion of all the fuel gas in the mixture of gases in the chamber 26 takes place before the closure 62 is ruptured.

Figure 10:
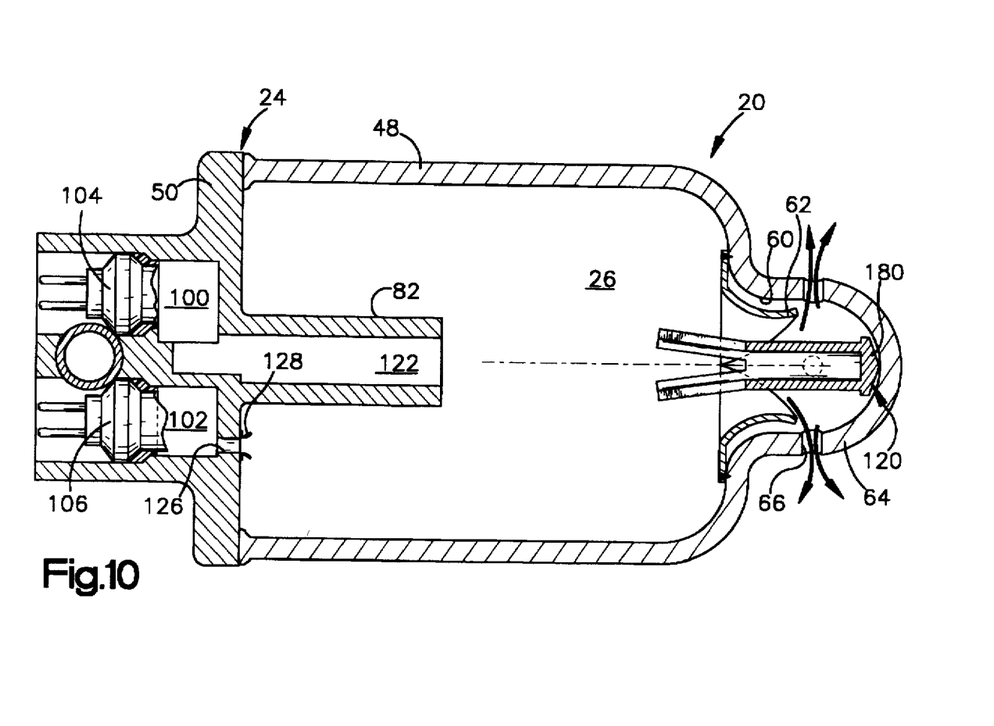

The projectile 120 moves away from the guide 82 and strikes the closure 62. The end portion 180 of the projectile 120 ruptures the closure 62. The projectile 120 continues to move through the ruptured closure 62 and the end portion 180 engages the diffuser portion 64, as illustrated in FIG. 10. The pressurized gas flows from the chamber 26, through the opening 60, into the diffuser portion 64 and is directed to inflate the air bag 22. The air bag 22 is thus inflated by inert gas, by-products from combustion of the fuel gas, and unconsumed oxidizer gas in the mixture of gases.

Figure 11:
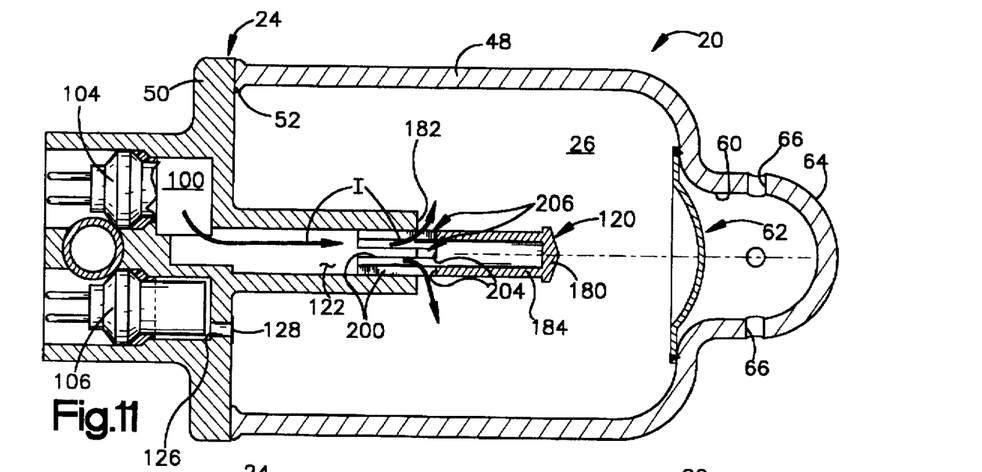
FIGS. 11–13 are views similar to FIG. 1 illustrating parts of the inflator in different conditions during yet another mode of operation.

In a third mode of operation, the igniter 106 is actuated after the igniter 104 is actuated and after the closure 62 ruptures. In this mode of operation, the igniter 104 (FIG. 11) is actuated in the manner identical to that which is illustrated in FIG. 6 and described above. The combustion products I produced by the igniter 104 enter the chamber 122 and act on surfaces of the projectile 120 to force the projectile to move in the guide 82 to the right, as viewed in FIG. 11. As the projectile 120 moves relative to the guide 82, ends 204 of the slots 200 move to a position past the end 182 of the guide 82. The combustion products I flow through the openings 206 and into the chamber 26. The openings 206 increase in flow area as the projectile 120 continues to move out of the guide 82.

Figure 12:
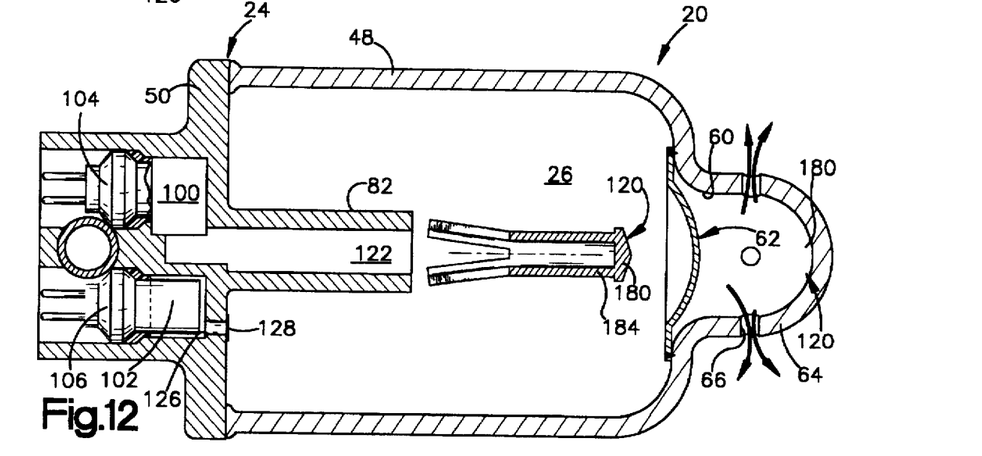

The combustion products I released into the chamber 26 ignite the combustible fuel gas in the mixture of gases. The projectile 120 moves to a position completely outside of the guide 82, as illustrated in FIG. 12. The entire chamber 26 fills with heated gas at a maximum pressure before the closure 62 ruptures. Combustion of all the fuel gas in the mixture of gases in the chamber 26 takes place before the closure 62 is ruptured.

Figure 13:
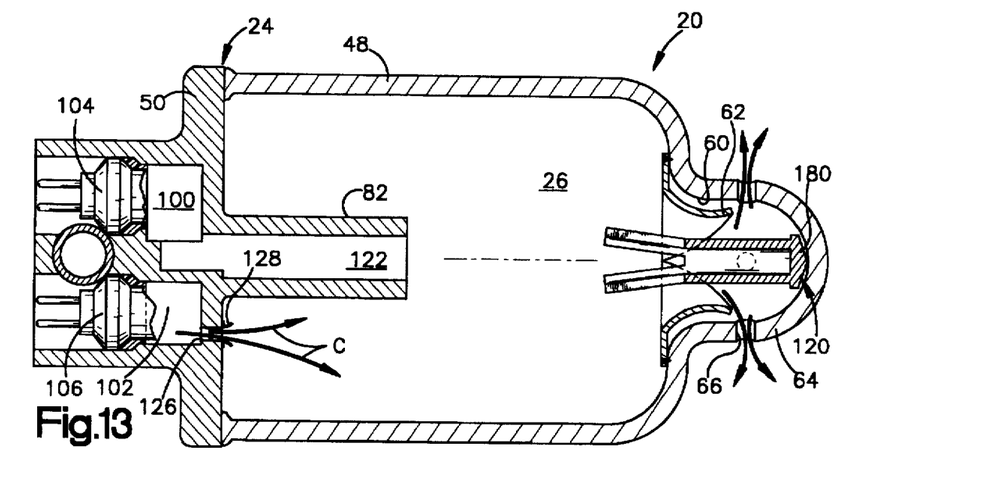

The projectile 120 then moves away from the guide 82 to strike the closure 62. The end portion 180 of the projectile 120 ruptures the closure 62. The projectile 120 continues to move through the ruptured closure 62 and the end portion 180 engages the diffuser portion 64, as illustrated in FIG. 13. The pressurized gas flows from the chamber 26, through the opening 60, into the diffuser portion 64 and is directed to start inflating the air bag 22.

The igniter 106 is then actuated and produces combustion products C which are released into the recess 102, as illustrated in FIG. 13. The passage 126 directs the combustion products C against the member 128 to rupture the member. The combustion products C are released into the chamber 26, as illustrated in FIG. 13. The combustion products C further heat the mixture of gases in the chamber 26 to pressurize the gas in the chamber further. The further pressurized gas in the chamber 26 is directed to inflate the air bag 22. The air bag 22 is thus inflated by inert gas, by-products from combustion of the fuel gas, and unconsumed oxidizer gas in the mixture of gases.

From the above description of the invention, those skilled in the art will perceive improvements, changes and modifications. For example, the container 24 could be constructed so the pair of chambers 26, 122 are hermetically sealed from each other and from the environment external to the container. The chamber 122 would hold ignitable material, such as a combustible fuel gas or a mixture of hydrogen and oxygen. The chamber 26 would store inflation fluid, such as inert gas, under pressure.

The ignitable material in the chamber 122 would be ignited by actuation of the igniter 104. Combustion products produced by actuation of the igniter 104 and combustion of the ignitable material in the chamber 122 would act on surfaces of the projectile 120 to rupture the area adjacent the attachment weld 186. Combustion of the ignitable material in the chamber 122 would take place before the hermetic seal would be broken and the combustion products would be released from the chamber 122. The combustion products would force the projectile 120 to move in the guide 82 toward the closure 62. As the projectile 120 moves relative to the guide 82, ends 204 of the slots 200 would move to a position past the end 182 of the guide 82. The combustion products would flow through the openings 206 and into the chamber 26.

The combustion products released into the chamber 26 would heat the inflation fluid. The projectile 120 would move to a position completely outside of the guide 82. The entire chamber 26 would be filled with heated and pressurized inflation fluid at a maximum pressure before the closure 62 would be ruptured. The projectile 120 would then move away from the guide 82 to strike and rupture the closure 62. The pressurized inflation fluid would flow from the chamber 26 and would be directed to inflate the air bag 22. Further, although the inflatable occupant protection device is described above as an air bag, it could also be an inflatable seat belt, an inflatable head liner, or a knee bolster which is actuated by an air bag. Such improvements, changes and modifications within the skill of the art are intended to be covered by the appended claims.

Having described the invention, the following is claimed:

1. An apparatus for inflating an inflatable vehicle occupant protection device, said apparatus comprising:
   a container defining a chamber;
   inflation fluid and ignitable material in the chamber;
   means defining an opening in said container through which inflation fluid may flow from the chamber to inflate the protection device;
   a rupturable closure blocking flow through the opening in said container;
   a projectile supported by said container at a location spaced from said closure; and
   actuatable means supported by said container for producing combustion products which propel said projectile to rupture said closure and which are directed into the chamber to ignite said ignitable material in the chamber before said projectile ruptures said closure.

2. The apparatus of claim 1 wherein said actuatable means comprises a first igniter which upon actuation, propels said projectile towards said closure and releases combustion products into the chamber upon said projectile moving a predetermined distance relative to said container, said actuatable means further includes a second igniter which, upon actuation, releases additional combustion products into the chamber.

3. The apparatus of claim 2 wherein said container comprises a base fixed to a housing and said projectile comprises an end portion and a tubular portion extending from said end portion, said base including a guide portion located in the chamber, said tubular portion of-said projectile being supported by said guide portion of said base to define an expansible second chamber in fluid communication with said first igniter, said tubular portion of said projectile being guided during movement in a direction toward said closure by said guide portion of said base.

4. The apparatus of claim 3 further including a slot in said tubular portion of said projectile, said slot releasing combustion products from the expansible second chamber upon said projectile moving the predetermined distance relative to said guide portion of said base.

5. The apparatus of claim 2 wherein said container includes at least one recess for receiving at least one of said igniters and a passage having a portion extending into the recess, the recess having a shoulder for limiting movement of said at least one igniter in a first direction relative to said container, a member being receivable in the passage to engage said at least one igniter and limit movement of said at least one igniter in a second direction opposite the first direction.

6. The apparatus of claim 5 further including an elastomeric seal between said shoulder and said at least one igniter to bias said at least one igniter in the second direction toward said member.

7. The apparatus of claim 1 further including means for releasing combustion products into the chamber in response to said projectile moving a predetermined distance relative to said container.

8. An apparatus for inflating an inflatable vehicle occupant protection device, said apparatus comprising:
   a container defining a chamber for inflation fluid, said container having an opening through which fluid may flow to inflate the protection device;
   a rupturable closure blocking fluid flow through the opening in said container;
   actuatable means for, upon actuation, producing combustion products to effect the rupture of said closure;
   a recess in said container for receiving said actuatable means, said recess being defined in part by a surface portion that limits movement of said actuatable means in a first direction relative to said container;
   a passage in said container communicating with the recess; and
   a member receivable in the passage for limiting movement of said actuatable means in a second direction opposite the first direction when said member is in the passage.

9. The apparatus of claim 8 further including a resiliently compressible elastomeric seal between said actuatable means and said surface portion partially defining said recess to bias said actuatable means in the second direction toward said member in response to being compressed.

10. The apparatus of claim 9 wherein said actuatable means comprises a housing including a flange which is engageable with said seal and said member.

11. The apparatus of claim 8 wherein said member is tubular for receiving a second member for mounting said container.

12. An apparatus for inflating an inflatable vehicle occupant protection device, said apparatus comprising:
   a container defining a chamber;
   inflation fluid and ignitable material in the chamber;
   means defining an opening in said container through which inflation fluid may flow from the chamber to inflate the protection device;
   a rupturable closure blocking flow through the opening in said container;
   a projectile supported by said container at a location spaced from said closure;
   actuatable means supported by said container for producing combustion products which propel said projectile to rupture said closure and are directed into the chamber to ignite said ignitable material in the chamber before said projectile ruptures said closure;
   surface means in said container for defining a recess which receives said actuatable means and a passage communicating with the recess, the recess being at least partially defined by a shoulder that limits movement of said actuatable means in a first direction relative to said container; and
   a member receivable in the passage to engage said actuatable means for limiting movement of said actuatable means relative to said container in a second direction opposite the first direction.

13. The apparatus of claim 1 wherein said chamber contains a combustible mixture of gases comprising said inflation fluid and said ignitable material.

14. The apparatus of claim 13 wherein said combustible mixture of gases is stored in said chamber.

15. The apparatus of claim 8 wherein said chamber contains a combustible mixture of gases comprising said inflation fluid and said ignitable material.

16. The apparatus of claim 15 wherein said combustible mixture of gases is stored in said chamber.

17. The apparatus of claim 12 wherein said chamber contains a combustible mixture of gases comprising said inflation fluid and said ignitable material.

18. The apparatus of claim 17 wherein said combustible mixture of gases is stored in said chamber.

19. An apparatus for inflating an inflatable vehicle occupant protection device, said apparatus comprising:

a container defining first and second chambers, said first chamber containing a combustible comprising mixture of gasescomprising inflation fluid and fuel gas, said second chamber containing ignitable material which, when ignited, produces combustion products for heating said inflation fluid;

means for defining an opening through which said combustion products flow from said second chamber to said first chamber to heat said inflation fluid;

means for igniting said ignitable material in said second chamber; and means for igniting said fuel gas in said first chamber before said combustion products flow from said second chamber to said first chamber to heat said inflation fluid.

20. The apparatus of claim 19 further comprising a rupturable closure blocking an outlet from said first chamber and a projectile supported by said container at a location spaced from said closure, and wherein said means for igniting said fuel gas comprises an igniter which, when actuated, propels said projectile through said closure and ignites said fuel gas with combustion products that are released into said first chamber upon said projectile moving a predetermined distance relative to said container.

21. The apparatus of claim 20 wherein said projectile has a slot which releases combustion products into said first chamber upon said projectile moving said predetermined distance relative to said container.

22. An apparatus for inflating an inflatable vehicle occupant protection device, said apparatus comprising:

a container having a chamber containing a combustible mixture of gases under pressure, said combustible mixture of gases including a fuel gas which is stored in said container;

a first igniter which, when actuated, ignites said combustible mixture of gases in said chamber to increase said pressure;

a second igniter which, when actuated, ignites said combustible mixture of gases in said chamber to increase said pressure; and controller means for actuating said first and second igniters in a selected one of a plurality of differing modes in response to parameters monitored by said controller means.

23. The apparatus of claim 22 wherein said differing modes include a mode in which said first and second igniters are actuated concurrently, and further include a mode in which said first and second igniters are actuated sequentially.

* * * * *